United States Patent [19]

Okamura et al.

[11] Patent Number: 5,206,328
[45] Date of Patent: Apr. 27, 1993

[54] PROCESS FOR THE PRODUCTION OF AN ORGANOPOLYSILOXANE

[75] Inventors: Yoshio Okamura; Nobuyuki Terae; Tetsuo Okamoto; Hiroshi Ohashi; Hiroyasu Hara, all of Gunma, Japan

[73] Assignee: Shin-Etsu Chemical Co., Ltd., Tokyo, Japan

[21] Appl. No.: 652,139

[22] Filed: Feb. 8, 1991

[30] Foreign Application Priority Data

Feb. 8, 1990 [JP] Japan .................................. 2-29235
Mar. 5, 1990 [JP] Japan .................................. 2-53165

[51] Int. Cl.$^5$ .................................................. C08G 77/06
[52] U.S. Cl. .................................... 528/14; 528/18; 528/21; 528/23; 528/33; 528/40; 528/27; 556/467

[58] Field of Search ............... 528/40, 14, 18, 21, 528/23, 33, 27; 556/467

[56] References Cited

U.S. PATENT DOCUMENTS 4,208,503 6/1980 Martin .................................. 528/14

Primary Examiner—Melvyn I. Marquis
Attorney, Agent, or Firm—Millen, White, Zelano & Branigan

[57] ABSTRACT

An organopolysiloxane containing at least one epoxy group is produced by heating a mixture of (a) an epoxy group-containing organosiloxane; (b) an organosiloxane lacking an epoxy group and optionally containing an arkenyl group; (c) an aprotic polar organic solvent; and (d) a basic catalyst, until reaction between (a) and (b) by a disproportionation equilibration reaction occurs.

18 Claims, No Drawings

PROCESS FOR THE PRODUCTION OF AN ORGANOPOLYSILOXANE

BACKGROUND OF THE INVENTION

The present invention relates to a method of manufacturing organopolysiloxanes, more particularly to a method of manufacturing an epoxy group-containing organopolysiloxane having a relatively high polymerization degree by a simple reaction which is not accompanied by cleavage of the oxirane ring of the epoxy group during the reaction. The invention further relates to a method for producing an organopolysiloxane which contains both epoxy and alkenyl groups and, therefore, can be effectively used as an epoxy group-containing silicone coating compound and as the epoxy group-containing silicone compound that constitutes the main ingredient of an addition reaction-type hardenable organopolysiloxane.

Epoxy group-containing organopolysiloxanes are used in numerous applications, such as fabric finishing agent, water repellent agent, modifier for resin material, etc. Especially, those having a relatively high polymerization degree are capable of imparting desired degrees of soft and pleasant feel to materials mixed therewith and are considered excellent fabric finishing agent because they do not cause the treated fabric to become excessively slimy and turn yellow, as fabric treated with aminosiloxane does.

Already various methods are known for manufacturing epoxy group-containing organopolysiloxanes, including those wherein an olefin group-containing siloxane is peroxidized, for example, vinylsiloxane is peroxidized in a 40%-acetyl hydroperoxide solution; a method wherein a siloxane which has been Grignard-reacted to introduce a $\equiv SiCH_2MgBr$ group into its molecule is epoxidated with alkali and epichlorohydrin; and a method wherein a chlorosilane or an acetoxylsilane is treated with glycidol to obtain glycidyl silicone ether (U.S. Pat. No. 2,730,532). All of these methods are poor in yield (only 20% in the first method), require complicated process conditions, and are not consistent in the production results. Furthermore, although these methods are suitable for epoxidating silane and low molecular weight siloxanes, they do not work well when epoxidizing relatively high molecular weight siloxanes due to various limitations in reaction conditions. A problem with the '532 patent method is that the resulting organosiloxane is readily hydrolyzed or alcoholized due to the presence therein of an epoxy organo group bonded to Si atom via an ether linkage, so that the product is extremely unstable.

As a method for manufacturing epoxidated organopolysiloxane of high molecular weight, a method was proposed (U.S. Pat. No. 3,431,143) wherein an unsaturated epoxy monomer and an organohydrogenpolysiloxane containing an Si-bonded hydrogen atom(s) undergo an addition reaction in the presence of a peroxide or a Pt-containing catalyst. This method requires relatively simple reaction conditions and gives high yields; but when the method is employed to obtain a product of relatively high polymerization degree, control of the reaction becomes difficult, and it is also difficult to prepare the starting organohydrogenpolysiloxane of a high polymerization degree, so that the manufacture flow becomes complicated and time-consuming to the extent that the manufacturing cost becomes too high. Furthermore, with this method it is impossible to make an epoxy group-containing organopolysiloxane having alkenyl as a group or attached to a side chain, which is a useful main ingredient of an addition reaction-type hardenable organopolysiloxane. In order to make this organopolysiloxane, if an addition reaction is caused to occur between an alkenyl-containing organohydrogenpolysiloxane and an unsaturated epoxy monomer, an undesirable addition between the hydrogen attached to a Si atom and the alkenyl proceeds to form a gel.

A method is known for the production manufacture of an organosiloxane wherein an organosiloxane is produced from low molecular weight organosiloxane such as a cyclic siloxane through a siloxane rearrangement equilibration reaction in the presence of a strongly acidic or basic compound as a catalyst. However, since an epoxy group is easily attacked by acid, an acid catalyst cannot be used in the equilibration of the epoxy group-containing siloxane, and if a base catalyst is employed, the equilibration with the siloxane having an epoxy group is so slow that cleavage of the oxirane ring of the epoxy group occurs more readily.

It is known that the equilibration of an organopolysiloxane is facilitated through an addition of a small amount of certain polar solvents. It is also known that a siloxane rearrangement equilibration reaction occurs with a mixture of octamethylcyclotetrasiloxane and hexamethyldisiloxane in tetrahydrofuran in the presence of a strongly basic compound such as potassium hydroxide as a catalyst. However, these reactions are not practical because the presence of even an extremely small amount of an impurity will adversely affect the reaction.

To manufacture an organopolysiloxane in the presence of a base catalyst, a method is proposed wherein the reaction rate is increased by the addition of an alkylsulfoxide, such as dimethylsulfoxide (U.S. Pat. No. 3,175,995). However, cleavage of the epoxy ring reduces the yield of the desired organopolysiloxane. Moreover, these organic solvents have high melting points and dimethylsulfoxide, because of its low melting point, is a solid during the winter season. Therefore, they are not easy to handle, and their high boiling point make them difficult to separate after the reaction so that their characteristic smell remains in the product. Furthermore, when the thus produced siloxane is used together with other resin in a fabric treatment, discoloration occurs and the stability of the treatment liquid becomes low.

A method is also known wherein an organopolysiloxane saturated with water (an amount of less than one weight % is equilibrated in the presence of a base catalyst to thereby obtain an epoxy group-containing siloxane of relatively low molecular weight which retain uncleaved the oxirane rings of the epoxy groups (Japanese Patent Kokoku No. 51-33839). Although the equilibration rate is improved by this method, it is not possible to prevent cleavage of the oxirane rings of epoxy group by the water and the presence of water also produces silanol groups at the ends of the siloxane molecule during the equilibration reaction which stops the growth of the siloxane chain. It thus becomes difficult to obtain high molecular weight polymers and also, since the distribution range of polymerization degree of the product polymers becomes wide, molecular weight control becomes difficult. Thus, reproducing the same polymer is very difficult. Furthermore, after the equilibration, when the product is neutralized and stripped of the unreacted low molecular siloxane, the amount of the hydroxyl contained in the product changes, causing the viscosity to vary greatly so that it is difficult to control the viscosity.

OBJECTS OF THE INVENTION

The present invention was made in view of the above problems and, therefore, it is an object of the invention to provide a manufacturing method to produce organopolysiloxanes containing an epoxy group which solves these problems.

The inventors, therefore, examined various methods of siloxane rearrangement equilibration of organopolysiloxanes containing an epoxy group in the presence of a basic catalyst and, as a result, they found that when an aprotic organic solvent containing no sulfur atom in the molecule was added to a equilibration reaction system comprising a mixture of a siloxane containing an epoxy group and a siloxane which does not contain an epoxy group, in the presence of a basic equilibration catalyst, it became possible to cause the reaction system to undergo reaction even when the viscosity of the system was relatively low, and, thereby, the equilibration reaction could be expedited so that the reaction time is shortened, and an organopolysiloxane containing an epoxy group and a high polymerization degree could be produced. Furthermore, they found that it was possible to control the polymerization degree of the thus-produced organopolysiloxane containing an epoxy group, employing various kinds of reactants at various dosages.

The inventors further researched methods of equilibrating epoxy group- and alkenyl group-containing organopolysiloxanes in the presence of a basic catalyst, and found that when an aprotic polar solvent was added to a equilibration reacting system comprising a mixture of siloxane containing an epoxy group and a siloxane containing an alkenyl group, in the presence of a basic equilibration catalyst, it became possible to cause the reaction system to undergo equilibration at a high rate, irrespective of whether the low molecular siloxanes to be equilibrated were cyclic or straight chain; that the cleavage of the oxirane ring of the epoxy group did not accompany the equilibration reaction; that it was possible to control the polymerization degree of an organopolysiloxane to a desired value since no active hydrogen-containing compound, such as water, is required which would have produced a silanol group at the ends of the molecular chain of the organopolysiloxane, thereby allowing the molecule to participate in a condensation reaction with another silano-stopped chain. As the inventors tried various kinds of elements used in various dosages, they arrived at the present invention.

SUMMARY OF THE INVENTION

According to this invention, a method is provided for producing an organopolysiloxane containing an average of at least one epoxy group in the molecule, which method comprises effecting a reaction of an organosiloxane containing an epoxy group and organosiloxane without an epoxy group in the presence of an aprotic polar organic solvent and a basic catalyst.

More specifically, this invention relates to a process for the production of an organopolysiloxane containing at least one epoxy group and a relatively high degree of polymerization which comprises heating a mixture of (a) an epoxy-containing organosiloxane having a lower degree of polymerization than the desired product and at least one epoxy group in the molecule; (b) an amount effective to react with (a) by a disproportionation equilibration reaction of an epoxy-less organosiloxane; (c) an aprotic polar organic solvent; and (d) a basic catalyst, until condensation of the epoxy group-containing organosiloxane and the epoxy-less organosiloxane by an equilibration rearrangement reaction occurs.

In a first embodiment of the invention, the inventive method is effective in obtaining an organosiloxane containing an average of one or more epoxy groups per molecule and which has a higher degree of polymerization than the starting epoxy group-containing organosiloxane (a). Also, because the structure of the thus produced organopolysiloxane is the result of combining the molecules, or fragments thereof, of the starting epoxy group-containing organosiloxane (a) and the epoxy-less organosiloxane (b), the product is a mixed organosiloxane, i.e., one or both of the organic radicals on at least one silicon atom differ from one or both of the organic radicals of at least one other silicon atom.

The polymer units of these mixed structure organopolysiloxanes produced according to the first embodiment of this invention collectively can be represented by the general formula

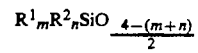

wherein $R^1$ is a monovalent organic group containing an epoxy derived from the starting epoxy group-containing organosilane; $R^2$ is a hydrocarbon group of 1–8 carbons containing no epoxy group derived from the starting epoxy-less organosiloxane or an alkoxyl group of 1–3 carbons; m and n are numbers such that $n/m \geq 3$ and $1.8 < m+n < 2.1$.

The first embodiment of this invention is especially useful for increasing the molecular weight, i.e., the degree of polymerization of an epoxy group-containing organopolysiloxane by a predetermined amount in a predictable and reproducible manner.

The method of this first embodiment is preferably conducted by heating a mixture of 100 weight parts of a mixture of (a) an organopolysiloxane containing an epoxy group and having a degree of polymerization lower than the desired product (b) an organosiloxane which does not contain an epoxy group; (c) 1 to 50 weight parts of an aprotic polar organic solvent containing no sulfur in the molecule; and (d) 0.001 to 1 weight part of a basic equilibration catalyst.

In a second embodiment of the invention, the organosiloxane lacking an epoxy group (b) contains an alkenyl group and the thus-produced organopolysiloxane preferably contains an average of at least one epoxy group and at least one alkenyl group per molecule. Thus, in the above general formula, $R^1$ comprises an epoxy group-containing hydrocarbon group and $R^2$ comprises an alkenyl group-containing hydrocarbon group. Because the condensation reaction is a equilibration-type reaction, it will be appreciated by those skilled in the art that in a formula depicting the polymeric form of the thus-produced organopolysiloxane, the polymer units may represent only a portion of the molecule of the starting epoxy group-containing organosiloxane and/or the starting epoxy-less organosiloxane when either is as an organopolysiloxane.

A organopolysiloxane containing both epoxy and alkenyl groups is preferably produced by equilibrating a mixture of 100 parts by weight of (a) an epoxy group-containing organosiloxane and (b) an epoxy-less alkenyl group-containing organosiloxane, (c) 5-100 weight parts of the aprotic polar organic solvent and (d) the basic catalyst.

DETAILED DESCRIPTION OF THE INVENTION

The present invention in its first embodiment comprises producing an organopolysiloxane containing an epoxy group by heating, and thus causing the siloxanes therein to undergo an equilibration rearrangement reaction, a mixture consisting essentially of (a) a mixture of organosiloxane containing an epoxy group; (b) an organosiloxane lacking an epoxy group; (c) an aprotic polar organic solvent containing no sulfur atom in the molecule; and (d) a basic equilibration catalyst. The invention also is a method of manufacturing an organopolysiloxane containing both an epoxy and an alkenyl group by equilibrating a mixture comprising (i) a mixture of epoxy group-containing organopolysiloxane and alkenyl group-containing organosiloxane, (ii) an aprotic polar organic solvent, and (iii) a basic catalyst.

The organosiloxane starting material employed in the first embodiment of the method of the present invention is a mixture of a siloxane containing an epoxy group and an organosiloxane containing no epoxy group. For operational advantage reasons, these siloxanes preferably have polymerization degrees of less than 100 and can be a cyclic siloxane, a disiloxane, or a straight chain siloxane.

The epoxy group-containing organosiloxane can, e.g., (i) be a cyclic siloxane represented by

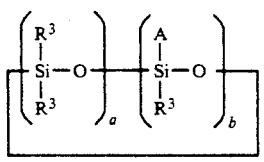

(I)

wherein each $R^3$ is the same or a plurality of different monovalent hydrocarbon groups of 1-20, e.g., from 1-10, carbons which can be unsubstituted or substituted with one or more groups which are non-reactive under the reaction conditions and, in the first embodiment of the invention, is not alkenyl, e.g., alkyl, e.g., methyl, propyl, butyl; aryl, alkanyl and aralkyl, e.g., phenyl, tolyl; halogenated alkyl, e.g., chloromethyl, trifluoropropyl; and cyanoethyl; A is an organic group containing an epoxy group; a is 0 or a positive integer, e.g., from 1 to 10, and b is a positive integer; or (ii) a straight chain siloxane represented by

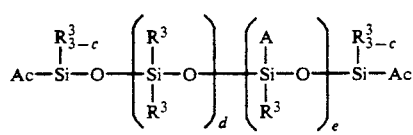

(II)

wherein $R^3$ and A are the same as above; c is 0 or 1; and d and e are 0 or a positive integer. Examples of such epoxy group-containing organic A groups are:

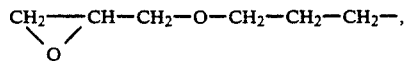

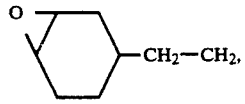

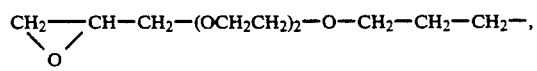

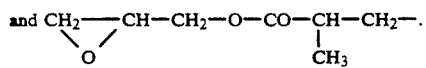

Examples of such cyclic epoxy group-containing organosiloxane are:

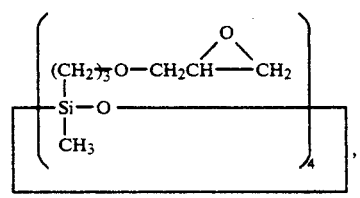

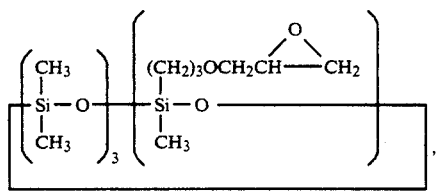

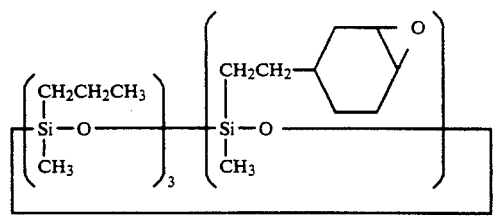

and

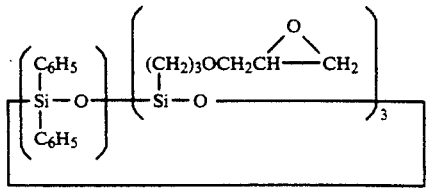

Examples of such straight chain epoxy group-containing organosiloxane are:

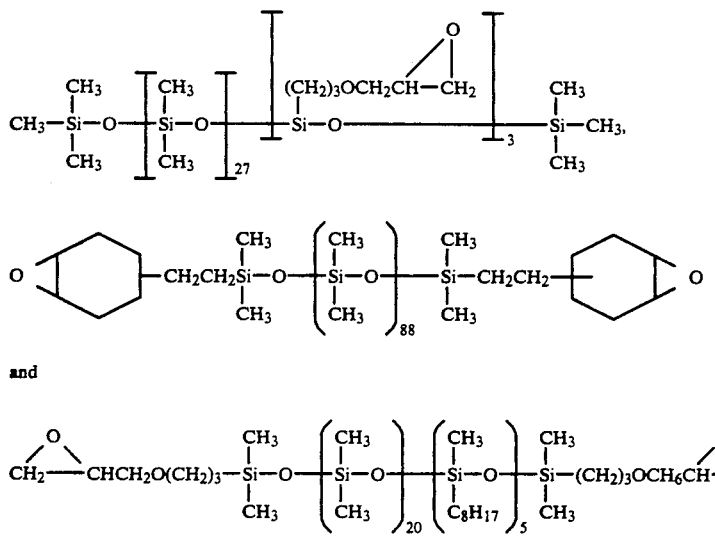

and

The organosiloxanes lacking an epoxy group employed in the first embodiment of the invention can be any of the conventionally known compounds, e.g., examples are:

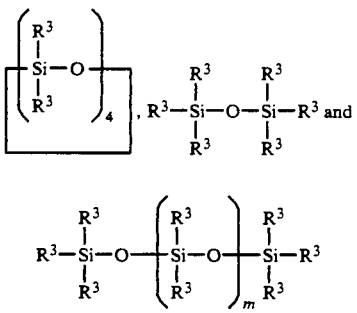

wherein $R^3$ and m have the values given above. These relatively low molecular weight organosiloxanes can be obtained by hydrolysis and condensation polymerization of corresponding chlorosilanes or alkoxy silanes singly or a mixture of each. Introduction of an epoxy group into a silane or siloxane to obtain an epoxy group-containing silane or siloxane can be conducted by a known method. Examples of such known methods for introducing epoxy include: (1) a method wherein an olefin-containing silane or siloxane is peroxidized; (2) a method wherein a silane which is Grignard-reacted to introduce a Grignard group is treated with an alkali and a haloepoxide, such as epichlorohydrin; (3) a method wherein chlorosilane or acetoxyl silane compound is reacted with glycidol to produce a glycidyl silicone ether; (4) a method wherein an unsaturated epoxy monomer is subjected to an addition reaction with a hydrosiloxane in the present of a Pt-containing catalyst. Method (4) is the most preferred for the reason that the operation is simple and the yield is high. Moreover, the product is highly durable since it contains water-resistant silicon-carbon bond(s). According to this method, the dosage of the epoxy monomer required in the addition reaction with the organohydrogensiloxane ordinarily is no more than 20 weight % in excess of the stoichiometrically required amount, in order to avoid side reactions or polymerization of the unreacted epoxy monomer.

The ratio of the organosiloxane containing an epoxy group to the organosiloxane without an epoxy group in the first embodiment of the invention can be arbitrarily selected based on the amount of epoxy groups desired to be in the organopolysiloxane product, i.e., a high molar ratio will produce a product with a higher average number of epoxy groups in the molecule than the product produced form the same reactants at a low molar ratio.

In the first embodiment of the invention, an aprotic polar organic solvent as the element (b) which contains no sulfur atom in the molecule is used, it has a high dielectric constant ($\epsilon$), and is characterized by lacking a proton-donor. Such an organic solvent is generally high in association tendency and, when used as the solvent for an organo-ionic reaction, the solvent undergoes dissociation from its self-association status, due to its proton modification capability, and assumes a more stable solvation status. Therefore, the solvent exhibits a strong interactive tendency toward ionic reaction active elements.

Some of the examples of such aprotic polar solvents are N,N-dimethylformamide, N,N-dimethylacetoamide, tetramethyleneurea, dimethylsulfoxide, hexamethylphosphoryl amide, acetonitrile, propylcarbonate, nitrobenzene, nitromethane, dimethylcyanamide, tetrahydrofuran, dioxane, and pyridine. Among these, N,N-dimethylformamide is the most preferred, for the reason that, being liquid at ambient temperature, it is easy to measure, dose and transport; due to its relatively low boiling point, the reaction can be controlled effectively; and the amide is easily dispelled from the reaction product after the reaction merely by heating the system and reducing the pressure, and thus the residual odor is slight.

If the dosage of this organic solvent is less than one weight part per 100 weight parts of the starting mixture (a) of organosiloxanes, the reaction rate of the siloxane rearrangement equilibration becomes so low that the result of the invention will be insufficient. If the dosage of the solvent is greater than 50 weight parts, excessive amounts of cyclic compounds are produced so that it becomes difficult to control the polymerization degree of a target value. Therefore, the dosage ordinarily must be 1 to 50 weight parts, preferably 5 to 40 weight parts.

The basic equilibration catalyst employed as element (c) of the first embodiment of the invention is used as the catalyst to promote the siloxane rearrangement equilibration reaction involving the organosiloxane as the element (a), and examples of the catalyst includes hydroxides of alkali metals, e.g., potassium hydroxide, sodium hydroxide, cesium hydroxide; silanolates of alkali metals, e.g., potassium methyltrihydroxysilanolate, potassium phenyltrihydroxysilanolate; potassium silanolates such as the product of the reaction between octamethylcyclotetrasiloxane and potassium hydroxide; quaternary ammonium salts, e.g., benzyltrimethylammoniumhydroxide, tetramethylammoniumhydroxide, trimethylammoniumhydroxide, octyltrimethylammoniumhydroxide; phosphonium salts having the general formula of $R^4_4POR^5$ (in which $R^4$ is a monovalent organic group and $R^5$ is hydrogen or a monovalent organic group), e.g., tetramethylphosphonium hydroxide, tetra-n-butylphosphonium hydroxide, phenyltrimethylphosphonium hydroxide, tetramethylphosphonium methoxide, tetrabutylphosphonium butoxide, butyltricyclohexylphosphonium hydroxide. Of these, potassium hydroxide, potassium silanolates, and phosphonium salts are preferred and tetra-n-butylphosphoniumhydroxide is the most preferable for the reason that it decomposes when the system is heated to strip the organic solvent whereby removal of the neutralized salt is not necessary.

If the dosage of the basic equilibration catalyst is less than 0.001 weight part per 100 weight parts of the organosiloxane mixture (1), the reaction rate of the siloxane rearrangement equilibration becomes excessively low. The reaction rate increases as the dosage is increased but when it exceeds one weight part, the effect is the same. Therefore, the effective dosage thereof is 0.001 to 1 weight part, preferably 0.1 to 0.5 weight part.

The method of manufacturing organopolysiloxane, according to the first embodiment of the invention, comprises steps of: uniformly mixing predetermined amounts of (a) a mixture of organosiloxane containing epoxy group and organosiloxane without an epoxy group, (b) an aprotic polar organic solvent, and (c) a basic equilibration catalyst; and heating the mixture to thereby initiate the siloxane rearrangement equilibration reaction. The temperature to which the mixture is heated preferably is 60° to 240° C., more preferably 80° to 180° C. Such temperatures cause the siloxane rearrangement equilibration reaction to proceed so readily, by virtue of the presence of aprotic polar organic solvent (b), that cleavage of the oxirane ring of the epoxy group scarcely occurs, and equilibration of the epoxy-containing organosiloxane proceeds smoothly to facilitate production of an epoxy-containing organo polysiloxane and precision controlling of the viscosity of the organopolysiloxane; thus the epoxy-containing organopolysiloxane can be obtained in high yield, which renders the method as industrially advantageous.

The organosiloxanes employed in the second embodiment of the present invention as starting materials are an epoxy group-containing siloxane and an alkenyl group-containing siloxane of relatively low molecular weight, e.g., having less than 100 siloxane units, i.e., a polymerization degree of less than 100.

Like in the case of the first embodiment, the epoxy-containing organosiloxanes can be cyclic siloxanes represented by the formula (I), or can be straight chain siloxanes represented by the formula (II).

Incidentally, examples of the epoxy-containing siloxane are already given in connection with the first embodiment of the invention.

The alkenyl group-containing organosiloxane employed in the process of the invention can be a cyclic siloxane represented by

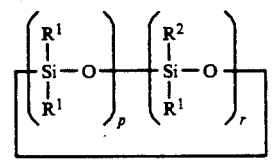

wherein $R^1$ is the same or different monovalent hydrocarbon group of 1–20 carbons, substituted or unsubstituted, which is not alkenyl and is selected from alkyl, e.g., methyl, propyl, butyl; aryl, e.g., phenyl, tolyl; chloromethyl, trifluoropropyl; and cyanoethyl; $R^2$ is an alkenyl of 2–8 carbons such as vinyl, allyl, propenyl, and n-butyryl; p is an integer not smaller than zero; r is a positive integer; or the alkenyl-containing organosiloxane can be a straight chain siloxane represented by

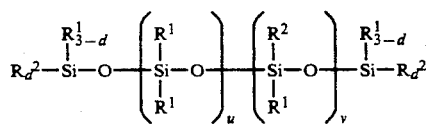

wherein $R^1$ and $R^2$ are the same as above; d is 0, 1, 2 or 3; u and v are integers not smaller than zero.

Examples of the alkenyl group-containing straight chain siloxanes are

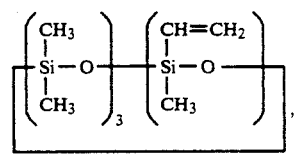

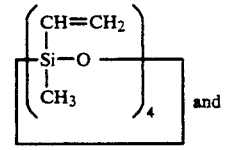
and

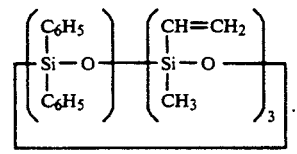

Examples of the alkenyl group-containing straight chain siloxanes are

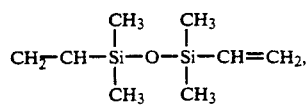

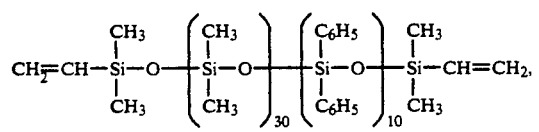

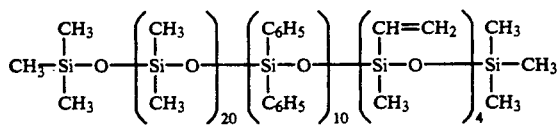

These organosiloxanes of relatively low molecular weights can be prepared in the same manners described in connection with the first embodiment.

The starting organosiloxanes used in the invention have relatively low molecular weight. In view of the purpose of the invention and reaction controllability, the polymerization degree of the organosiloxanes should be less than 100, or preferably less than 60.

The ratio of the second embodiment between the epoxy-containing organosiloxane and alkenyl-containing organosiloxane can be arbitrarily determined responsive to the desired amounts of epoxy groups and alkenyl groups desired in the thus-produced organopolysiloxane. It is also possible to measure and add cyclic and/or straight chain siloxanes having neither epoxy nor alkenyl to the reaction mixture to control the result. Examples of such epoxy/alkenyl-less siloxanes are as follows:

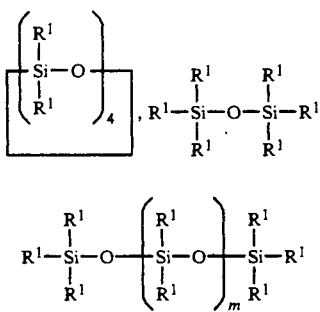

It is possible to use these organosiloxanes as the main starting materials and add epoxy and alkenyl groups to them.

The aprotic polar organic solvent used as the element (c) in the second embodiment of the invention can be the ones used as the element (c) of the first embodiment of the invention. Examples of such solvents can further include those containing a sulfur atom in the molecule, such as dimethylsulfoxide, tetramethylenesulfone, and liquid sulfurous acid. Tetramethylenesulfone, propylcarbonate, nitrobenzene, nitromethane, dimethylcyanamide, tetrahydrofurane, dioxane, pyridine, liquid sulfurous acid, etc. are useful in that they can avoid various problems attributable to the existence of an active hydrogen (proton) of a polar protonic solvent such as water and alcohol, and that the alkali equilibration reaction is markedly promoted due to the solvation.

There is no particular requirement as to the amount of the aprotic polar organic solvent added, but with a view toward obtaining effective solvation for the alkali equilibration reaction and economical considerations, the amount of the organic solvent should be 5 to 100 weight parts per 100 weight parts of the starting organosiloxane mixture of elements (a) and (b), or preferably 10 to 50 weight parts.

The basic equilibration catalyst as the element (iii) of the second embodiment of the invention can be any of those mentioned in connection with the first embodiment of the invention.

If the dosage of this basic catalyst of the second embodiment is less than 0.01 weight part per 100 weight parts of the starting organosiloxane mixture (i), the equilibration rate of the organosiloxane becomes too low; the reaction rate increases as the dosage is increased but when it exceeds 10 weight parts, the effect is the same. Therefore, the effective dosage is 0.01 to 10 weight parts, or preferably 0.5 to 5 weight parts.

The method according to the second embodiment of the invention is for manufacturing organopolysiloxane containing both epoxy and alkenyl groups and comprises steps of: uniformly mixing predetermined amounts of a mixture of (a) an epoxy group-containing organosiloxane, (b) an alkenyl group-containing organosiloxane, (c) an aprotic polar organic solvent, and (d) a basic catalyst; and heating the mixture to thereby initiate the siloxane rearrangement equilibration reaction. The temperature to which the mixture is heated is 60° to 240° C., preferably 80° to 180° C.; such temperatures cause the siloxane rearrangement equilibration reaction to proceed so readily, by virtue of the presence of aprotic polar organic solvent (c), that cleavage of the oxirane ring of the epoxy group scarcely occurs, and that equilibration of the alkenyl group-containing organosiloxane proceeds smoothly to facilitate production of an epoxy grup- and alkenyl group-containing organopolysiloxane and precision controlling of the viscosity of the organopolysiloxane. Thus, the epoxy group- and alkenyl group-containing organopolysiloxane can be obtained with high yield so as to justify the method as industrially advantageous.

Next, examples of how to synthesize the epoxy-containing organosiloxane used in the invention, and examples and comparative examples of the method of the invention will be described. Hereinafter, all the values of viscosity, specific gravity, and refractive index are taken at 25° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding applications Japanese Patent Appln. 2-29235, filed Feb. 8, 1990, and Japanese Patent Appln. No. 2-53165, filed Mar. 5, 1990, are hereby incorporated by reference.

Synthesis 1

A 4-liter four-necked flask equipped with a dropping funnel, a reflux condenser, and a thermometer was charged with 855 g of allyl glycidyl ether, 855 g of toluene, and 0.6 g of a chloroplatinic olefin complex salt containing 2 weight % of platinum. The mixture was heated at 110° C. for 30 minutes to be dehydrated by reflux; then, the temperature was lowered to 90° C. and a mixture of 405 g of 1,2,3,4-tetramethylcyclotetrasiloxane and 405 g of toluene was dripped into the flask by means of the dropping funnel, which took two hours during which the temperature was maintained at 90° C. After the dripping, the mixture was heated at 90° C. for 5 hours to effect reaction. Thereafter, the temperature was decreased to 30° C. and lower, and when the reaction was completed, the unreacted ≡SiH was treated with 20% solution of potassium hydroxide, whereby hydrogen gas was generated, and the reaction yield obtained by measuring the generated hydrogen was 98.7%.

The reaction mixture liquid was neutralized by washing it with water three times; the liquid was heated at 100° C. under a reduced pressure of 10 mmHg for three hours whereby it was stripped of the solvent and unreacted compounds; as the result Product 1 was obtained, which had a viscosity of 110 cS, a specific gravity of 1.117, a refractive index of 1.4623, an epoxy value of 0.574 mol/100 g, and the following structural formula, according to IR and NMR analyses:

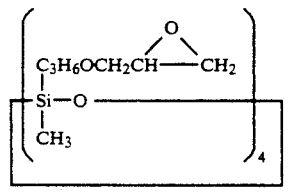

Synthesis 2

A 2-liter four-necked flask equipped with a dropping funnel, a reflux condenser, and a thermometer was charged with 92.9 g of allyl glycidyl ether, 207.1 g of heptamethylcyclotetrasiloxane, and 300 g of toluene; the mixture was heated at 110° C. for 30 minutes to be dehydrated by reflux; a chloroplatinic olefin complex salt containing 2 weight % of platinum was added, and the mixture was heated at 85° C. for 5 hours to effect reaction. When the reaction was completed, the quantity of generated hydrogen gas was measured, and the reaction yield obtained thereby was 100%.

The reaction mixture liquid was cooled, washed with water three times, and neutralized; then the mixture was stripped at 80° C. under a reduced pressure of 10 mmHg for three hours whereby Product 2 was obtained, which had a viscosity of 33 cS, a specific gravity of 1.028, a refractive index of 1.4254, an epoxy value of 0.252 mol/100 g, and the following structural formula, according to IR and NMR analyses:

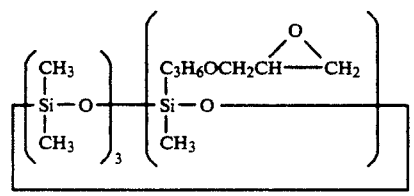

Synthesis 3

The same four-necked flask used in Synthesis 2 was charged with 156.8 g of acryl glycidyl ether, 156.5 g of toluene, and 0.5 g of the same chloroplatinic olefin complex salt used in Synthesis 1; the mixture was heated at 110° C. for 30 minutes to be dehydrated by reflux; then, the temperature was lowered to 90° C. and a mixture of 406.2 g of 1,2,3,4-tetramethyl-1,2,3-tripropylcyclotetrasiloxane and 406.2 g of toluene was dripped into the flask by means of the dropping funnel, which took two hours. After the dripping, the mixture was heated at 95° C. for 6 hours to continue the reaction. When the reaction was completed, the quantity of generated hydrogen gas was measured, and the reaction yield obtained thereby was 89.4%.

The reaction mixture liquid was cooled, washed with water three times, and neutralized; then the mixture was stripped at 100° C. under a reduced pressure of 10 mmHg for three hours whereby Product 3 was obtained, which had a viscosity of 11 cS, a specific gravity of 0.994, a refractive index of 1.4347, an epoxy value of 0.208 mol/100 g, and the following structural formula, according to IR and NMR analyses:

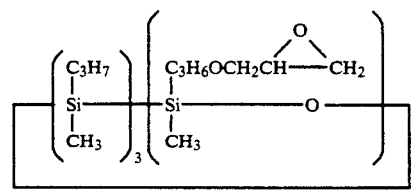

Synthesis 4

Except that 930 g of vinylcyclohexene epoxide and 930 g of toluene were used in place of 855 g of allyl glycidyl ether and 855 g of toluene, the same steps were observed as in Synthesis 1. As the result, Product 4 was obtained at a yield of 97.4%. The volatile component of Product 4 accounted for 1.2%; the epoxy value was 0.544 mol/100 g; according to IR and NMR analyses, the structural formula was:

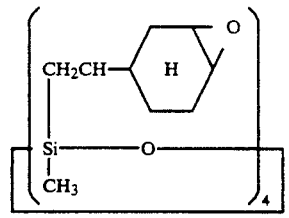

Synthesis 5

Except that in place of 405 g of 1,2,3,4-tetramethylcyclotetrasiloxane and 405 g of toluene, 909 g of methylhydrogenpolysiloxane, represented on the average by the following formula, and 909 g of toluene were used, the same steps were observed as in Synthesis 1.

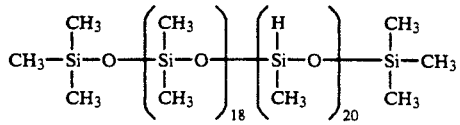

As the result, Product 5 was obtained at a yield of 96.4%. The volatile component (105° C., 3 hours) of Product 5 accounted for 0.8%; the viscosity was 580 cS; the epoxy value was 0.402 mol/100 g; according to IR and NMR analyses, the structural formula was:

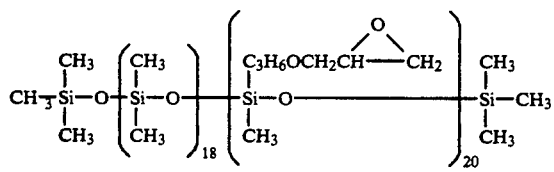

EXAMPLE 1

A one-liter four-necked flask equipped with a stirrer, a thermometer, and an inlet port for nitrogen gas was charged with 659 g of octamethylcyclotetrasiloxane, 17.4 g of Product 1 prepared in Synthesis 1, 74.1 g of dimethylpolysiloxane which has its ends stopped with trimethylsilyl groups and has a mean polymerization degree of 100, and 75 g of N,N-dimethylformamide. The mixture was heated at 110° C. for 30 minutes to be dehydrated by reflux; then, 2.5 g of $(nC_4H_9)_4POH$ as the basic catalyst was added to the mixture in the flask while the mixture was being stirred at 110° C. for 5 hours to promote the equilibration reaction.

After the reaction, the mixture was heated at 140° C. for one hour whereby the catalyst $(nC_4H_9)_4POH$ decomposed; the mixture was then cooled, treated with activated carbon, and filtered. The filtrate was heated at 120° C. for two hours at a reduced pressure of 10 mmHg, and stripped of the solvent and unreacted reactants. Thus, Product A was obtained.

Product A was a pale yellow transparent liquid, of which the volatile component accounted for 1.2% (105° C., 3 hours); the viscosity was 840 p; the refractive index 1.4046; the epoxy value 0.013 mol/100 g. This epoxy value was identical to the aimed value which was expected from the dosages of the reactants. When analyzed by GPC, Product A exhibited a single peak and found to have a molecular weight of 75,000 and a polymerization degree of about 1,000. IP and NMR analyses revealed the following formula of Product A:

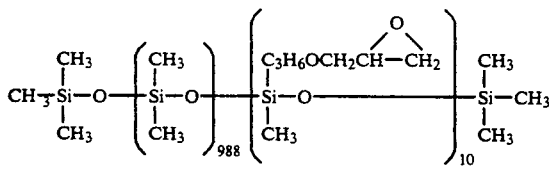

EXAMPLES 2-4

Except that the dosage of octamethylcyclotetrasiloxane was changed to those entered in Table 1, and that in place of 17.4 g of Product 1, Products 2, 3 and 4 in respective amounts entered in the same table were used, the same steps in Example 1 were observed. Thus, Products B, C and D were synthesized, and their properties are entered in Table 2.

EXAMPLE 5

Except that the starting elements used were 724 g of octamethyltetracyclosiloxane, 24.9 g of Product 5, 1.18 g of octamethyltrisiloxane, 45 g of N,N-dimethylformamide, and 1.5 g of $(nC_4H_9)_4POH$, the same steps were observed as in Example 1, and as a result, Product E was obtained. This was a pale yellow transparent liquid of which the volatile component accounted for 1.2% (105° C., 3 hours); the viscosity was 830p; the epoxy value 0.012 mol/100 g. When analyzed by GPC, Product E exhibited a single peak and found to have a molecular weight of 75,000 and a polymerization degree of about 1,000. It had no smell, and the methoxy value was zero.

EXAMPLES 6-8

Except that in place of 74.1 g of dimethylpolysiloxane, different organopolysiloxanes as entered in Table 3 were used in amounts indicated, the same steps were observed as in Example 1. The resulting Products F, G and H had properties as shown in Table 4.

COMPARATIVE EXAMPLES 1-5

Except that in place of 75 g of N,N-dimethylformamide, either no solvent was used, or different solvents entered in Table 5 were employed in amounts indicated, the same steps of Example 1 were followed. The properties of the products thus obtained are also entered in Table 5. In all of Comparative Examples 1-5, the epoxy value was found lower than the level attained by the present invention, and, as such, none of the products of these comparative examples could attain the desired properties desired. Also, in two of these comparative examples, equilibration did not occur sufficiently so that the peak attributable to the reactants showed in the result of GPC analysis of the products. In one comparative example, the result of GPC analysis exhibited such a broad plateau that it was impossible to locate the peak attributable to the products. Only in two of these comparative examples, it was possible to determine the molecular weight by GPC analysis.

EXAMPLES 9-10; COMPARATIVE EXAMPLES 6-7

Except that the dosage of N,N-dimethylformamide was 22.5 g (Example 9), 500 g (Example 10), 3.75 g (Comparative Example 6), or 750 g (Comparative Example 7), the same procedure of Example 1 was observed. Table 6 shows the properties of the resultant products.

EXAMPLES 11-13; COMPARATIVE EXAMPLE 8

A 3-liter four-necked flask equipped with a dropping funnel, a reflux condenser, and a thermometer was charged with starting elements the kinds and dosages of which are shown in Table 7. The same procedure was observed as in Example 1, and a polymerization degree of 200 was aimed. Table 7 shows the results.

The results of these examples and comparative examples support the improved effects of the first embodiments of the present invention.

Synthesis 6

A 3-liter four-necked flask equipped with a dropping funnel, a reflux condenser, and a thermometer was charged with 559.8 g of polydimethylmethylhydrogen block copolymer (mean molecular weight: 5,598) having trimethylsilyl-stopped molecular ends and containing 30 mol % of $\equiv SiH$ group according to the measurement of the quantity of the hydrogen gas generated therefrom; 328.3 g of allyl glycidyl ether, 1,000 g of toluene, and 0.5 g of a chloroplatinic olefin complex salt containing 2 weight % of platinum. The mixture was heated at 120° C. for 6 hours to undergo reactions; then, the temperature was decreased to 30° C. and lower, and when the reaction was completed, the unreacted ≡SiH was treated with 20% solution of potassium hydroxide, whereby hydrogen gas was generated, and the reaction yield obtained by measuring the generated hydrogen was 98%.

The reaction mixture liquid was neutralized by washing it with water three times; the liquid was heated at 120° C. under a reduced pressure of 10 mmHg for two hours whereby it was stripped of the solvent and unreacted compounds; as the result Product 6 was obtained, which had a viscosity of 1.280 cS, a specific gravity of 1.012, a refractive index of 1.435, an epoxy value of 0.288 mol/100 g, and the following structural formula, according to IR and NMR analyses:

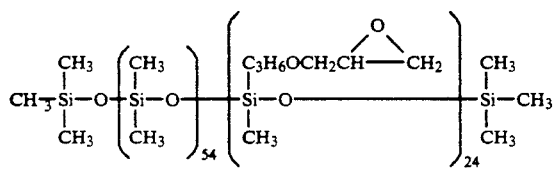

EXAMPLE 14

A one-liter four-necked flask equipped with a stirrer, a thermometer, and an inlet port for nitrogen gas was charged with 444.1 g of octamethylcyclotetrasiloxane, 11.6 g of Product 1 prepared in Synthesis 1, 44.3 g of dimethylpolysiloxane which has its ends stopped with dimethylvinylsilyl groups and has a mean molecular weight of 1000, and 100 g of N,N-dimethylformamide. The mixture was heated at 115° C. for two hours to be dehydrated by reflux; then, 2.5 g of (nC$_4$H$_9$)$_4$POH as the basic catalyst was added to the mixture in the flask while the mixture was being stirred at 110° C. for three hours to promote the equilibration reaction.

After the reaction, the mixture was heated at 140° C. for one hour whereby the catalyst (nC$_4$H$_9$)$_4$POH decomposed; the mixture was then cooled, treated with activated carbon, and filtered. The filtrate was heated at 130° C. for two hours at a reduced pressure of 10 mmHg, and stripped of the solvent and unreacted reactants. Thus, Product K was obtained.

Product K was an organopolysiloxane containing epoxy and vinyl in the molecule, and the molecular weight was about 10,900 according to the GPC analysis. The epoxy value was 0.014 mol/100 g, and the vinyl value was 0.018 mol/100 g, and these values were identical to the aimed values expected from the dosages of the reactants. The volatile component accounted for 1.2% (105° C., 3 hours); the viscosity was 328 cS; the refractive index 1.4055. IP and NMR analyses revealed the following formula of Product K:

EXAMPLES 15-17

Except that the dosages of octamethylcyclotetrasiloxane, Product 1, and dimethylpolysiloxane stopped with dimethylvinylsilyl groups were changed to those entered in Table 8, the same steps in Example 1 were observed to effect equilibration reaction. Thus, Products L, M and N were synthesized, and their properties are entered in Table 9.

EXAMPLE 18

The same one-liter four-necked flask used in Example 14 was charged with 430.1 g of octamethylcyclotetrasiloxane, 26.1 g of Product 2 prepared in Synthesis 2, 43.8 g of dimethylpolysiloxane which has its ends stopped with dimethylvinylsilyl groups and has a mean molecular weight of 1000, and 100 g of dimethylsulfoxide. The mixture was heated at 115° C. for two hours to be dehydrated by reflux; then, 1.0 g of potassium siliconate catalyst containing 10% of KOH was added to the mixture in the flask while the mixture was being stirred at 110° C. for 3 hours to promote the equilibration reaction.

After the reaction, 50 g of tributylphosphate was added, and the mixture was stirred for one hour at 80° C. to effect neutralization; then, the mixture was cooled, treated with activated carbon, and filtered. The filtrate was heated at 130° C. for two hours at a reduced pressure of 10 mmHg, and stripped of the solvent and unreacted reactants. Thus, Product P was obtained, which was an organopolysiloxane compound containing both epoxy and vinyl groups. The properties, etc., of Product P are entered in Table 10.

EXAMPLE 19

Except that dosages of the octamethylcyclotetrasiloxane, Product 2, and the dimethylpolysiloxane were, respectively, 340.5 g, 119.2 d and 40.2 g, the same steps of Example 18 were observed, and as a result, Product Q which is an organopolysiloxane compound containing both epoxy and vinyl groups was obtained. The properties, etc. of Product Q are entered in Table 10.

EXAMPLES 20-22

The same one-liter four-necked flask used in Example 14 was charged with: octamethylcyclotetrasiloxane; Product 3 or 4 prepared in Synthesis 3 or 4; dimethylpolysiloxane stopped with dimethylvinylsilyl groups having a mean molecular weight of 1000; and hexamethylphosphoryl amide in respective amounts as entered in Table 11. The mixture was heated at 115° C. for two hours to be hydrated by reflux; then, 2.5 g of (nC$_4$H$_9$)$_4$POH as the basic catalyst was added to the mixture in the flask while the mixture as being stirred at 110° C. for three hours to promote the equilibration reaction. After the reaction, the mixture was heated at 135° C. for one hour whereby the catalyst (nC$_4$H$_9$)$_4$POH decomposed; the mixture was then

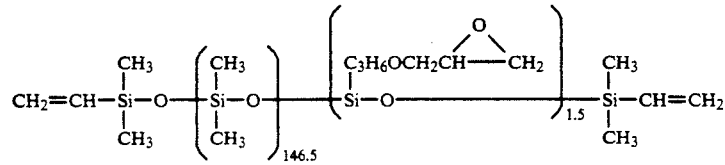

cooled, treated with activated carbon, and filtered. The filtrate was heated at 130° C. for four hours at a reduced pressure of 10 mmHg, and stripped of the solvent and unreacted reactants. Thus, Products R, S, T were obtained. The properties, etc. of Products R, S, T are entered in Table 12.

EXAMPLE 23

The same one-liter four-necked flask used in Example 14 was charged with: 451.9 g of octamethylcyclotetrasiloxane; 2.5 g of 1,2,3,4-tetramethyl-1,2,3,4-tetravinylcyclotetrasiloxane; 40.8 g of Product 6 prepared in Synthesis 6; 4.8 g of dimethylpolysiloxane stopped with trimethylsilyl groups having a mean molecular weight of 976; and 50 g of N,N-dimethylformamide. The mixture was heated at 115° C. for two hours to be hydrated by reflux; then, 2.5 g of (nC$_4$H$_9$)$_4$POH as the basic catalyst was added to the mixture in the flask while the mixture was being stirred at 110° C. for three hours to promote the equilibration reaction. After the reaction, the mixture was heated at 135° C. for one hour whereby the catalyst (nC$_4$H$_9$)$_4$POH decomposed; the mixture was then cooled, treated with activated carbon, and filtered. The filtrate was heated at 130° C. for two hours at a reduced pressure o 10 mmHg, and stripped of the solvent and unreacted reactants. Thus, Product U was obtained. Product U was an organopolysiloxane containing epoxy and vinyl in the molecule, and the molecular weight was about 51,050. The epoxy value was 0.024 mol/100 g, and the vinyl value was 0.006 mol/100 g. The volatile component accounted for 3.1% (130° C., 3 hours); the viscosity was 19,000 cS.

COMPARATIVE EXAMPLE 9

Except that the dosage of N,N-dimethylformamide was changed to 20 g or 25 g, the same steps were observed as in Example 23. The non-volatile portion of the resulting organopolysiloxanes was quantitatively analyzed. The results are entered in Table 13 together with the result of Example 23. It was confirmed that with the decreased dosages of N,N-dimethylformamide, the rate of equilibration reaction decreased.

TABLE 1

|  | Expoxy-Containing Siloxane | Octamethylcyclotetrasiloxane | Product |
|---|---|---|---|
| Example 2 | Product 2  39.6 g | 636 g | B |
| Example 3 | Product 3  48.0 g | 636 g | C |
| Example 4 | Product 4  18.4 g | 659 g | D |

TABLE 2

| PROPERTIES | EXAMPLES No. | | |
|---|---|---|---|
|  | 2 | 3 | 4 |
|  | COMPOUND | | |
|  | B | C | D |
| appearance | pale yellow transparent liquid | | |
| volatile component (105° C. × 3 hr) (%) | 1.2 | 1.3 | 1.2 |
| viscosity (p) | 820 | 890 | 850 |
| epoxy value (mol/100 g) | 0.013 | 0.013 | 0.013 |
| GPC | single peak | single peak | single peak |
| mean molecular weight | 75,000 | 77,000 | 75,000 |
| mean polymerization degree | about 1,000 | about 1,000 | about 1,000 |
| smell | No | No | No |
| metoxy value | 0 | 0 | 0 |

TABLE 3

|  | Starting Siloxane | Product |
|---|---|---|
| Example 6 | 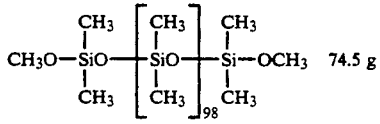 74.5 g | F |
| Example 7 | [(CH$_3$)SiO$_{3/2}$]$_2$ [(CH$_3$)$_2$SiO]$_{94}$<br>[(CH$_3$)SiO$_{1/2}$]$_4$   74.1 g | G |
| Example 8 | 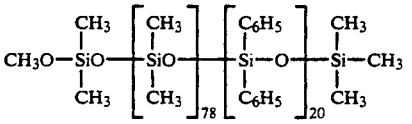 98.9 g | H |

TABLE 4

| PROPERTIES | EXAMPLES No. | | |
|---|---|---|---|
|  | 6 | 7 | 8 |
|  | COMPOUND | | |
|  | F | G | H |
| appearance | pale yellow transparent liquid | | |
| volatile component (105° C. × 3 hr) (%) | 1.3 | 1.2 | 1.2 |
| viscosity (p) | 900 | 1.010 | 1.060 |
| epoxy value (mol/100 g) | 0.013 | 0.013 | 0.013 |
| GPC | single peak | single peak | single peak |
| mean molecular weight | 75,000 | 75,000 | 77,000 |
| mean polymerization degree | about 1,000 | about 1,000 | about 1,000 |
| smell | No | No | No |
| metoxy value | 0.0027 | 0 | 0 |

TABLE 5

| Solvent | COMPARATIVE EXAMPLES No. | | | | |
|---|---|---|---|---|---|
|  | 1 | 2 | 3 | 4 | 5 |
|  | PROPERTIES | | | | |
| name | none | xylene | water | dimethylsulfoxide | isobutyl alcohol |
| dosage (g) | — | 75 | 75 | 75 | 75 |
| appearance | white cloudy liquid | yellow slightly cloudy liquid | yellow transparent liquid | yellowish brown strongly cloudy semi-gel | pale yellow transparent liquid |
| volatile component (105° C. × 3 hr) (%) | 2.4 | 5.8 | 6.2 | 1.2 | 2.1 |
| viscosity (p) | 52 | 43 | 120 | not measurable | 220 |

TABLE 5-continued

| | COMPARATIVE EXAMPLES No. | | | | |
|---|---|---|---|---|---|
| Solvent | 1 | 2 | 3 | 4 | 5 |
| | | | PROPERTIES | | |
| name | none | xylene | water | dimethylsulfoxide | isobutyl alcohol |
| dosage (g) | — | 75 | 75 | 75 | 75 |
| epoxy value (mol/100 g) | 0.008 | 0.011 | 0.007 | 0.005 | 0.010 |
| GPC | 2 peaks | 2 peaks | single peak | broad peak | single peak |
| mean molecular weight | — | — | 6,200 | too gel-like to measure | 19,600 |
| mean polymerization degree | — | — | 84 | — | 260 |
| smell | No | No | No | strong | No |

TABLE 6

| | Examples | | Comparative Examples | |
|---|---|---|---|---|
| | | No. | | |
| PROPERTIES | 9 | 10 | 6 | 7 |
| appearance | pale yellow transparent liquid | | pale yellow slightly cloudy liquid | |
| volatile component (105° C. × 3 hr) (%) | 1.2 | 1.2 | 1.3 | 1.7 |
| viscosity (p) | 840 | 750 | 320 | 190 |
| epoxy value (mol/100 g) | 0.013 | 0.013 | 0.009 | 0.011 |
| GPC | single peak | single peak | 2 peaks | 2 peaks |
| mean molecular weight | 75,000 | 75,000 | — | — |
| mean polymerization degree | about 1,000 | about 1,000 | — | — |
| smell | No | No | No | No |

TABLE 7

| | No. | | | |
|---|---|---|---|---|
| | Comparative Examples | | | Comparative |
| COMPOUND | 11 | 12 | 13 | Example 8 |
| Compound 1 | 34.8 | 348 | 696 | 1.740 |
| octamethylcyclotetrasiloxane | 1443 | 1310 | 1162 | 718 |
| octamethyltrisiloxane | 23.6 | 23.6 | 23.6 | 23.6 |
| N,N-dimethylformamide | 75 | 84 | 94 | 124 |
| $(n-C_4H_9)_4POH$ | 3.0 | 3.4 | 3.8 | 5.0 |
| aimed composition * | $MD_{196}D'_2M$ | $MD_{178}D'_{20}M$ | $MD_{158}D'_{40}M$ | $MD_{98}D'_{100}M$ |
| appearance | pale yellow transparent liquid | | | white cloudy liquid |
| viscosity (p/25° C.) | 4.0 | 11.7 | 36.2 | 1060 |
| GPC | single peak | single peak | single peak | 2 peaks |
| mean polymerization degree | about 200 | about 200 | about 200 | |
| epoxy value (mole/100 g) | 0.013 | 0.119 | 0.231 | 0.403 | remark
* ... M ... $(CH_3)_3SiO_{1/2}$
D ... $(CH_3)_2SiO$
D' ...

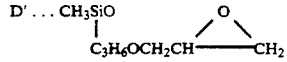

TABLE 8

| | No. | | |
|---|---|---|---|
| Reactants | Example 15 | Example 16 | Example 17 |
| octamethylcyclotetrasiloxane | 403.0 g | 357.2 g | 316.4 g |
| Product 1 | 54.9 g | 103.3 g | 146.2 g |
| dimethylpolysiloxane with molecular ends stopped with dimethylvinylsilyl groups | 42.1 g | 39.5 g | 37.4 g |

TABLE 9

| | No. | | |
|---|---|---|---|
| Properties | Product L | Product M | Product N |
| volatile component (105° C. × 3 hr) (%) | 2.9 | 2.7 | 3.6 |
| viscosity (p) | 488 | 735 | 931 |
| refractive index | 1.4112 | 1.4180 | 1.4236 |
| epoxy value (mol/100 g) | 0.064 | 0.118 | 0.164 |
| vinyl value (mol/100 g) | 0.017 | 0.016 | 0.015 |
| mean molecular weight | 12,100 | 12,900 | 13,400 |

TABLE 13

| dosage of N,N-dimethylformamide | non-volatile portion (%) |
|---|---|
| 50 g | 97.4 |
| 25 g | 75.6 |
| 20 g | 26.9 |

TABLE 10

| Properties | No. Product P | No. Product Q |
|---|---|---|
| volatile component (105° C. × 3 hr) (%) | 3.3 | 4.7 |
| viscosity (p) at 25° C. | 275 | 361 |
| refractive index at 25° C. | 1.4058 | 1.4118 |
| epoxy value (mol/100 g) | 0.013 | 0.067 |
| vinyl value (mol/100 g) | 0.019 | 0.018 |
| mean molecular weight | 10,400 | 11,300 |

TABLE 11

| Reactants | Example 20 | Example 21 | Example 22 |
|---|---|---|---|
| octamethylcyclotetrasiloxane | 403.0 g | 357.2 g | 316.4 g |
| Product 3 | 54.9 g | 103.3 g | 146.2 g |
| Product 4 | — | — | 57.5 g |
| dimethylpolysiloxane with molecular ends stopped with dimethylvinylsilyl groups | 43.4 g | 38.2 g | 41.8 g |
| hexamethylphosphoryl amide | 150 g | 150 g | 150 g |

TABLE 12

| Properties | Product R | Product S | Product T |
|---|---|---|---|
| volatile component (105° C. × 3 hr) (%) | 3.9 | 6.3 | 2.0 |
| viscosity (p) at 25° C. | 407 | 586 | 422 |
| refractive index | 1.4068 | 1.4162 | 1.4120 |
| epoxy value (mol/100 g) | 0.013 | 0.058 | 0.062 |
| vinyl value (mol/100 g) | 0.016 | 0.017 | 0.016 |
| mean molecular weight | 11,400 | 13,900 | 11,800 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of an organopolysiloxane containing at least one epoxy group and a relatively high degree of polymerization with respect to the starting epoxy group containing organopolysiloxane, said process comprises equilibrating a mixture of (a) an epoxy-containing organopolysiloxane having at least one epoxy group in the molecule; (b) an amount effective to react with (a) by a disproportionation equilibration reaction of an epoxyless organosiloxane lacking an epoxy group; (c) an aprotic polar organic solvent; and (d) a basic catalyst.

2. A process according to claim 1, wherein aprotic polar organic solvent is N,N-dimethylformamide, N,N-dimethylacetoamide, tetramethyleneurea, hexamethylphosphoryl amide or acetonitrile.

3. A process according to claim 1, wherein the basic catalyst is potassium hydroxide, a potassium silanolate or a phosphonium salt.

4. A process according to claim 1, wherein the epoxy containing organopolysiloxane (a) is
(i) a cyclic siloxane of Formula (I)

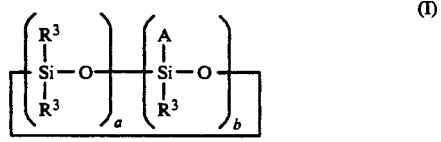

wherein $R^3$ is a monovalent hydrocarbon group of 1-20 carbon atoms which is unsubstituted or substituted with one or more groups other than alkenyl; A is an epoxy group-containing organic group; a is 0 or a positive integer; and b is a positive integer; or
(ii) a straight chain siloxane represented by formula II.

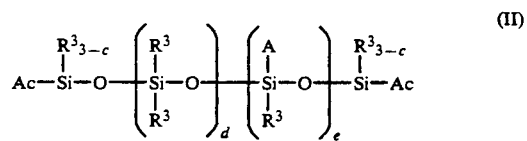

wherein $R^3$ and A are the same as above; c is 0 or 1; and d and e are 0 or positive integers provided that c and e are not zero at the same time.

5. A process according to claim 4, wherein aprotic polar organic solvent is N,N-dimethylformamide, N,N-dimethylacetoamide, tetramethyleneurea, hexamethylphosphoryl amide or acetonitrile.

6. A process according to claim 5, wherein the basic catalyst is potassium hydroxide, potassium silanolate or a phosphonium salt.

7. A process as claimed in claim 1, wherein said reaction mixture consists essentially of 100 weight parts of a mixture of (a) the epoxy group-containing organopolysiloxane and (b) the organosiloxane lacking an epoxy group; (c) 1 to 50 weight parts of an aprotic polar organic solvent containing no sulfur atom in the molecule; and (d) 0.001 to 1 weight part of a basic equilibration catalyst.

8. A process as claimed in claim 1, wherein the polymer units of the organopolysiloxane containing at least one epoxy group can be represented by the formula

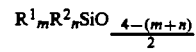

wherein $R^1$ represents a monovalent organic group containing an epoxy group; $R^2$ represents a monovalent hydrocarbon group of 1-8 carbons containing no epoxy group, or an alkoxyl group of 1-3 carbons; m and n are numbers such that $n/m \geq 3$ and $1.8 < m+n < 2.1$.

9. A process as claimed in claim 1, wherein the organosiloxane, (b) lacking an epoxy group, contains an alkenyl group in the molecule and the resulting epoxy-containing organopolysiloxane contains both epoxy and alkenyl groups.

10. A process as claimed in claim 9, wherein said reaction mixture consists essentially of 100 weights parts of a mixture of (a) the epoxy group-containing organopolysiloxane and (b) the alkenyl group-containing organosiloxane; (c) 5 to 100 weight parts of the aprotic polar organic solvent; and (d) 0.01 to 10 weight parts of the basic equilibration catalyst.

11. A process as claimed in claim 9, wherein said aprotic polar organic solvent is N,N-dimethylformamide, N,N-dimethylacetoamide, tetramethyleneurea, hexamethylphosphoryl amide or acetonitrile.

12. A process according to claim 9, wherein the basic catalyst is potassium hydroxide, potassium silanolate or a phosphonium salt.

13. A process according to claim 9, wherein the epoxy group-containing organosiloxane (a) is
    (i) a cyclic siloxane of formula (I)

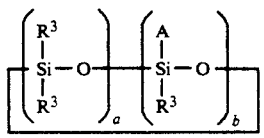

wherein $R^3$ is a monovalent hydrocarbon group of 1-20 carbon atoms which is unsubstituted or substituted with one or more groups other than alkenyl; A is an epoxy group-containing organic group; a is 0 or a positive integer; and b is a positive integer; or
    (ii) a straight chain siloxane represented by

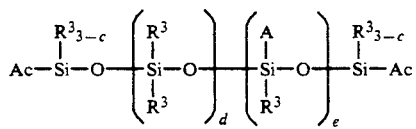

wherein $R^3$ and A are the same as above; c is 0 or 1; and d and e are 0 or positive integers provided that c and e are not zero at the same time.

14. A process as claimed in claim 13, wherein said aprotic polar organic solvent is N,N-dimethylformamide, N,N-dimethylacetoamide, tetramethyleneurea, hexamethylphosphoryl amide or acetonitrile.

15. A process according to claim 11, wherein the basic catalyst is potassium hydroxide, potassium silanolate or a phosphonium salt.

16. A process according to claim 1, wherein the aprotic polar organic solvent is N,N-dimethylformamide.

17. A process according to claim 13, wherein the epoxy group containing organosiloxane (a) is a straight chain siloxane.

18. A process for the production of an organopolysiloxane containing at least one epoxy group and relatively high degree of polymerization with respect to the starting epoxy group containing organopolysiloxane, said process comprises equilibrating a mixture of:
    I (a) an epoxy containing organopolysiloxane having at least one epoxy group in the molecule,
    (b) an amount effective to react with (a) by a disproportion equilibration reaction of an epoxyless organosiloxane lacking an epoxy group,
    (c) an aprotic polar organic solvent containing no S atom, and
    (d) a basic catalyst; or
    II (a) an epoxy containing organopolysiloxane having at least one epoxy group in the molecule,
    (b) an amount effective to react with (a) by a disproportion equilibration reaction of an epoxyless organosiloxane lacking an epoxy group and containing an alkenyl group,
    (c) an aprotic polar organic solvent, and
    (d) a basic catalyst.

* * * * *